US012649230B2

(12) United States Patent
Kim et al.

(10) Patent No.: US 12,649,230 B2
(45) Date of Patent: Jun. 9, 2026

(54) METHOD AND APPARATUS FOR PERFORMING ROBOT SKILL BASED ON SKILL UNCERTAINTY USING LARGE LANGUAGE MODEL

(71) Applicant: ELECTRONICS AND TELECOMMUNICATIONS RESEARCH INSTITUTE, Daejeon (KR)

(72) Inventors: Tae-Woo Kim, Daejeon (KR); Jae-Hong Kim, Daejeon (KR); Young-Woo Yoon, Daejeon (KR); Min-Su Jang, Daejeon (KR); Jae-Woo Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 119 days.

(21) Appl. No.: 18/393,944

(22) Filed: Dec. 22, 2023

(65) Prior Publication Data

US 2025/0187180 A1 Jun. 12, 2025

(30) Foreign Application Priority Data

Dec. 6, 2023 (KR) ........................ 10-2023-0175228

(51) Int. Cl.
*B25J 9/16* (2006.01)

(52) U.S. Cl.
CPC ............... *B25J 9/163* (2013.01); *B25J 9/161* (2013.01)

(58) Field of Classification Search
CPC .......... B25J 9/163; B25J 9/161; B25J 9/1653; G06N 3/08
See application file for complete search history.

(56) References Cited

U.S. PATENT DOCUMENTS

| | | | |
|---|---|---|---|
| 9,393,690 | B2 | 7/2016 | Lee et al. |
| 9,895,087 | B2 | 2/2018 | Lee et al. |
| 10,207,402 | B2 | 2/2019 | Levine et al. |
| 10,792,810 | B1 | 10/2020 | Beckman et al. |

(Continued)

FOREIGN PATENT DOCUMENTS

| | | |
|---|---|---|
| JP | 2020-082332 A | 6/2020 |
| JP | 7369890 B1 | 10/2023 |

(Continued)

OTHER PUBLICATIONS

Min-Su Jang et al., "Robot intelligence evolving with large language models" The Korean Institute of Communications and Information Sciences, May 2023.

*Primary Examiner* — Wade Miles
*Assistant Examiner* — Mohammed Yousef Abuelhawa
(74) *Attorney, Agent, or Firm* — LRK PATENT LAW FIRM

(57) ABSTRACT

Disclosed herein is a method for performing a robot skill based on skill uncertainty using a large language model. The method includes generating a subtask list using a large language model by receiving a target task and environment information, mapping a subtask in the subtask list into a skill embedding space through an abstract skill policy network, and performing the subtask by decoding the mapped subtask through a manipulation skill policy network.

16 Claims, 8 Drawing Sheets

(56)         References Cited

U.S. PATENT DOCUMENTS

| | | | |
|---|---|---|---|
| 11,534,911 | B2 | 12/2022 | Pascanu et al. |
| 2021/0252714 | A1 | 8/2021 | Hayashi et al. |
| 2023/0098783 | A1* | 3/2023 | Zaremoodi ............ G06N 3/044 |
| | | | 704/243 |
| 2023/0281422 | A1 | 9/2023 | Shankar et al. |
| 2023/0311335 | A1* | 10/2023 | Hausman ................. B25J 9/163 |
| | | | 700/246 |
| 2024/0045434 | A1 | 2/2024 | Ross et al. |
| 2024/0232642 | A1* | 7/2024 | van Hasselt ........... G06N 3/092 |
| 2024/0351217 | A1 | 10/2024 | Bollini et al. |
| 2024/0351218 | A1* | 10/2024 | Porter ...................... B25J 9/161 |
| 2025/0018562 | A1* | 1/2025 | Xia ......................... B25J 9/1653 |
| 2025/0144796 | A1* | 5/2025 | Liu .......................... B25J 9/163 |

FOREIGN PATENT DOCUMENTS

| | | | |
|---|---|---|---|
| KR | 10-2320659 | B1 | 11/2021 |
| KR | 10-2472592 | B1 | 12/2022 |
| KR | 10-2023-0138487 | A | 10/2023 |

* cited by examiner (a)

(b)

(c)

(d)

(1)

(2)

(3)

METHOD AND APPARATUS FOR PERFORMING ROBOT SKILL BASED ON SKILL UNCERTAINTY USING LARGE LANGUAGE MODEL

CROSS REFERENCE TO RELATED APPLICATION

This application claims the benefit of Korean Patent Application No. 10-2023-0175228, filed Dec. 6, 2023, which is hereby incorporated by reference in its entirety into this application.

BACKGROUND OF THE INVENTION

1. Technical Field

The present disclosure relates to a skill learning method for enabling a robot to understand and perform a task corresponding to a natural-language instruction.

More particularly, the present disclosure relates to technology for training skills of a robot using a large language model and improving the same based on uncertainty.

2. Description of Related Art

Conventional robot manipulation skill learning has been mostly performed by creating experience data using task programs and simulators or by utilizing demonstration datasets collected through teleoperation in a real-world environment. Experience data based on simulations may be collected at relatively low cost and in short time, but still has a domain gap with the real-world environment, and the degree-of-freedom of a robot action distribution is limited. Experience data collected in the real-world environment shows a high learning effect in learning of real-world tasks, but has disadvantages in which a lot of manpower and cost are required to collect a dataset and in which a demonstrator must always participate in the collection process.

In particular, continuous supervision of a demonstrator, which is required during a real-world demonstration process for correcting manipulation skills, results in a high degree of fatigue and low efficiency, and the timing of intervention or correction may be missed due to a demonstrator's judgement error, which may eventually lead to an accident. Furthermore, in natural-language-based manipulation skill methods, which have recently been actively studied in many research institutes, correct answer labeling by humans is essential to expand and improve such manipulation skills.

In order to resolve such inefficiency, the present disclosure proposes an automated method capable of effectively learning and improving natural-language-based manipulation skills while minimizing direct human intervention based on a large language model. Also, the present disclosure proposes a conservative skill inference method based on uncertainty in order to remedy errors and safety problems caused by incorrect actions of robots in unexpected or unfamiliar situations that were not experienced at the time of learning.

DOCUMENTS OF RELATED ART (Patent Document 1) Korean Patent No. 2320659, titled "Unit action deep-learning model learning method using robot and robot control method using the same".

SUMMARY OF THE INVENTION

An object of the present disclosure is to minimize a high degree of involvement and supervision of humans required in a robot manipulation skill learning process.

Another object of the present disclosure is to enable a robot to infer the uncertainty of a task by itself and to reflect the uncertainty to performance of a manipulation skill.

In order to accomplish the above objects, a method for performing a robot skill based on skill uncertainty using a large language model according to an embodiment of the present disclosure includes generating a subtask list using a large language model by receiving a target task and environment information, mapping a subtask in the subtask list into a skill embedding space through an abstract skill policy network, and performing the subtask by decoding the mapped subtask through a manipulation skill policy network.

Here, mapping the subtask may comprise inferring task uncertainty and cognitive uncertainty through the abstract skill policy network.

Here, mapping the subtask may comprise regenerating the subtask list when the task uncertainty is greater than a preset value.

Here, performing the subtask may comprise storing experience data of a process of performing the subtask when the cognitive uncertainty is greater than a preset value.

Here, the abstract skill policy network may include a task-motion network and a cognitive network, the task-motion network may generate output of a task-motion embedding space by receiving the subtask, and the cognitive network may generate output of a cognitive embedding space by receiving an image feature vector.

Here, mapping the subtask may comprise calculating the task uncertainty based on the output of the task-motion embedding space, calculating the cognitive uncertainty based on the output of the cognitive embedding space, and calculating skill uncertainty through a neural network layer by receiving the output of the task-motion embedding space and the output of the cognitive embedding space.

Here, mapping the subtask may comprise calculating skill uncertainty based on a result of mapping the subtask into the embedding space.

Here, performing the subtask may comprise calculating the skill uncertainty at preset time intervals and setting a weight for output of the skill embedding space at a specific time based on the skill uncertainty.

Here, the weight for the output of the skill embedding space may decrease with an increase in the skill uncertainty.

Also, in order to accomplish the above objects, an apparatus for performing a robot skill based on skill uncertainty using a large language model according to an embodiment of the present disclosure includes a subtask list generation unit for generating a subtask list using a large language model by receiving a target task and environment information, a task mapping unit for mapping a subtask in the subtask list into a skill embedding space through an abstract skill policy network, and a task performance unit for performing the subtask by decoding the mapped subtask through a manipulation skill policy network.

Here, the task mapping unit may infer task uncertainty and cognitive uncertainty through the abstract skill policy network.

Here, the subtask list generation unit may regenerate the subtask list when the task uncertainty is greater than a preset value.

Here, the task performance unit may store experience data of a process of performing the subtask when the cognitive uncertainty is greater than a preset value.

Here, the abstract skill policy network may include a task-motion network and a cognitive network, the task-motion network may generate output of a task-motion embedding space by receiving the subtask, and the cognitive network may generate output of a cognitive embedding space by receiving an image feature vector.

Here, the task mapping unit may calculate the task uncertainty based on the output of the task-motion embedding space, calculate the cognitive uncertainty based on the output of the cognitive embedding space, and calculate skill uncertainty through a neural network layer by receiving the output of the task-motion embedding space and the output of the cognitive embedding space.

Here, the task mapping unit may calculate skill uncertainty based on a result of mapping the subtask into the embedding space.

Here, the task performance unit may calculate the skill uncertainty at preset time intervals and set a weight for output of the skill embedding space at a specific time based on the skill uncertainty.

Here, the weight for the output of the skill embedding space may decrease with an increase in the skill uncertainty.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
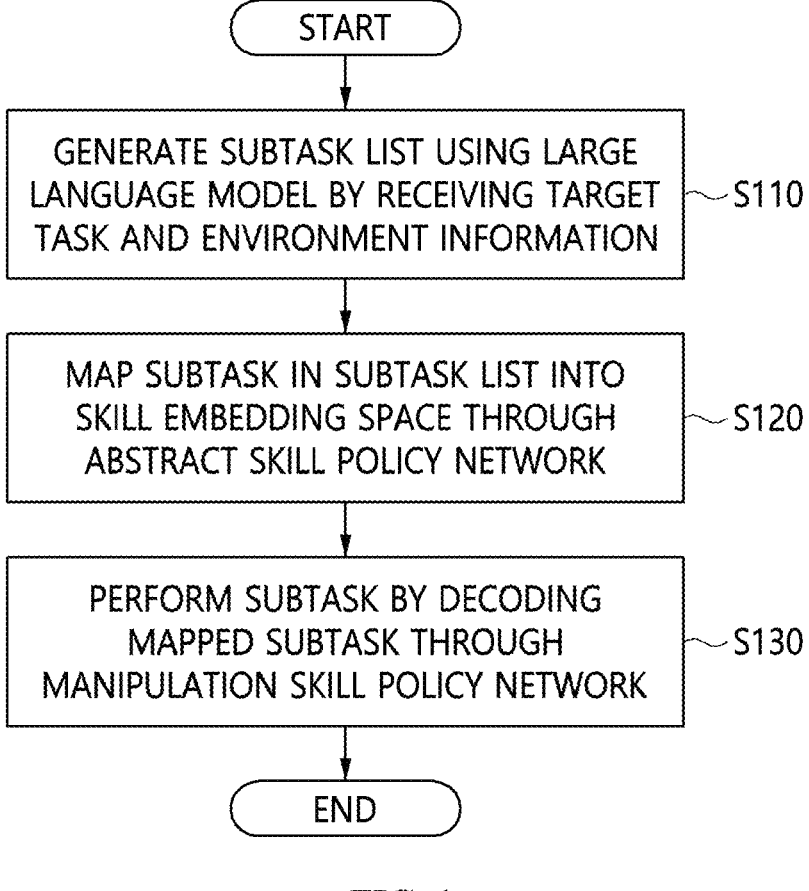
FIG. 1 is a flowchart illustrating a method for performing a robot skill based on skill uncertainty using a large language model according to an embodiment of the present disclosure.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

In the present specification, each of expressions such as "A or B", "at least one of A and B", "at least one of A or B", "A, B, or C", "at least one of A, B, and C", and "at least one of A, B, or C" may include any one of the items listed in the expression or all possible combinations thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a flowchart illustrating a method for performing a robot skill based on skill uncertainty using a large language model according to an embodiment of the present disclosure.

The method for performing a robot skill based on skill uncertainty using a large language model according to an embodiment of the present disclosure may be performed by a robot skill performance apparatus including operation and control functions or a robot including the same, but the scope of the present disclosure is not limited thereto.

Referring to FIG. 1, the method for performing a robot skill based on skill uncertainty using a large language model according to an embodiment of the present disclosure includes generating a subtask list using a large language model by receiving a target task and environment information as input at step S110, mapping a subtask in the subtask list into a skill embedding space through an abstract skill policy network at step S120, and performing the subtask by decoding the mapped subtask through a manipulation skill policy network at step S130.

Here, mapping the subtask at step S120 may comprise inferring task uncertainty and cognitive uncertainty through the abstract skill policy network.

Here, mapping the subtask at step S120 may comprise regenerating the subtask list when the task uncertainty is greater than a preset value.

Here, performing the subtask at step S130 may comprise storing experience data of the process of performing the subtask when the cognitive uncertainty is greater than a preset value.

Here, the abstract skill policy network may include a task-motion network and a cognitive network, the task-motion network may generate output of a task-motion embedding space by receiving a subtask, and the cognitive network may generate output of a cognitive embedding space by receiving an image feature vector.

Here, mapping the subtask at step S120 may comprise calculating the task uncertainty based on the output of the task-motion embedding space, calculating the cognitive uncertainty based on the output of the cognitive embedding space, and calculating skill uncertainty through a neural network layer by receiving the output of the task-motion embedding space and the output of the cognitive embedding space.

Here, mapping the subtask at step S120 may comprise calculating the skill uncertainty based on the result of mapping the subtask into the embedding space.

Here, performing the subtask at step S130 may comprise calculating the skill uncertainty at preset time intervals and setting a weight for the output of the skill embedding space at a specific time based on the skill uncertainty.

Here, the weight for the output of the skill embedding space may decrease with an increase in the skill uncertainty.

Figure 2:
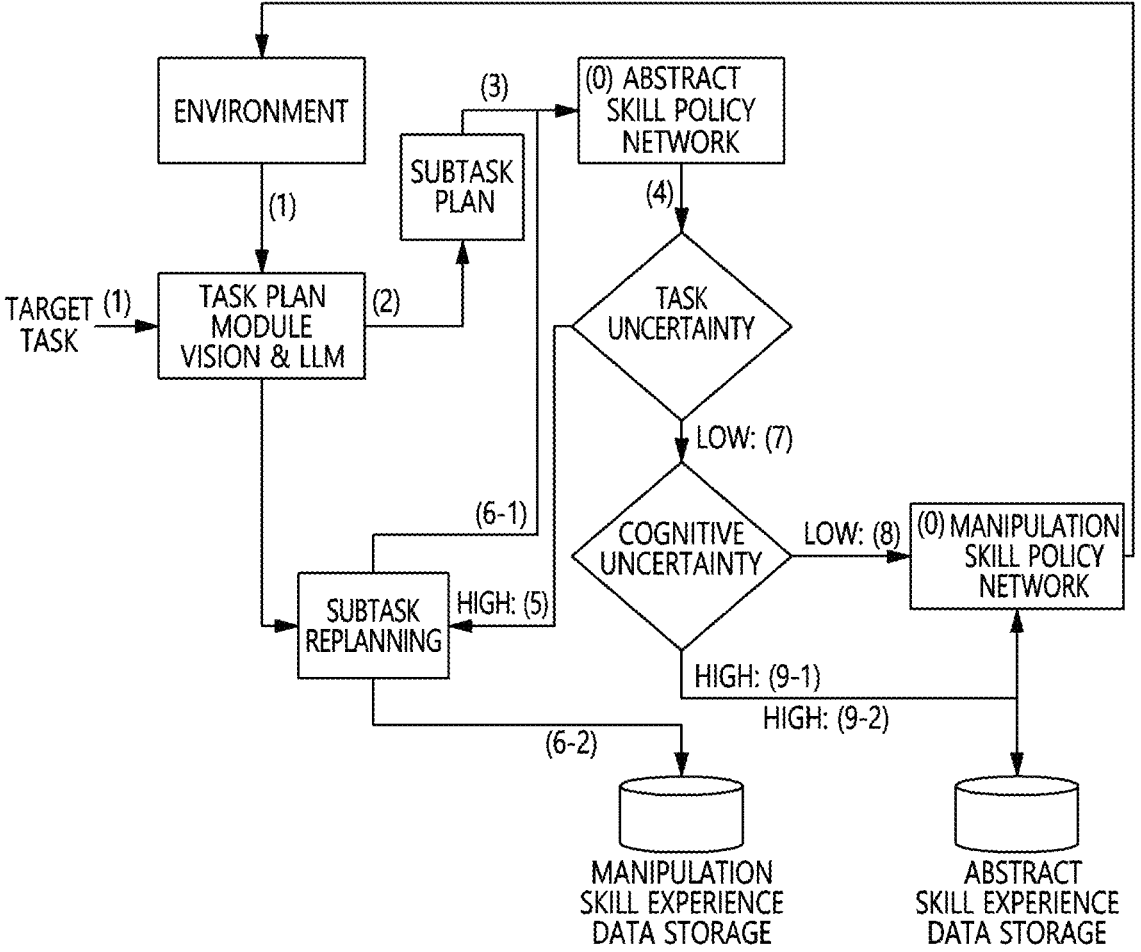
FIG. 2 illustrates the overall configuration for a method for skill learning based on a large language model and uncertainty according to an embodiment of the present disclosure.

FIG. 2 illustrates the overall configuration for a skill learning method based on a large language model and uncertainty according to an embodiment of the present disclosure.

The purpose of the method according to an embodiment of the present disclosure is to make, when a robot encounters an unfamiliar environment or task, the robot itself infer uncertainty for a task performance function and to improve the overall task skills through automated re-inference of the task based thereon. The present disclosure relates to an automated method for (re)planning subtasks through inference based on a large language model and learning and improving manipulation skills through environment information collected in this process, rather than performing learning through existing analytical programs or direct interaction with humans.

Referring to FIG. 2, a robot agent may learn initial skills using previously collected demonstration data (0). Here, learning the initial skills may mean training a skill policy network with the probability distribution of state-action trajectory data that is collected while a worker performs a target task by manipulating a robot. A task plan module may receive a target task from an administrator and receive current environment information (1). Based on the target task and the environment information, the task plan module may plan subtasks using a vision-information-processing module and a large language model (LLM) (2). Planning the subtasks may be performed as shown in the following example.

target task: {"bring me some water" }
 subtasks: {"go to the kitchen", "look for a bottle of water", "move to the target point (indicator)", "hand over the bottle of water"}

The skill policy network of the robot agent has a hierarchical structure, and may be configured with an abstract skill policy network for inferring skill embeddings of an abstracted layer and a manipulation skill policy network for decoding an action for actual driving of a robot from the skill embeddings. The subtask plan generated as described above is input to the abstract skill policy network (3), the subtask plan input along with the environment information may be encoded into one point in the corresponding skill embedding space through the abstract skill policy network (4). Here, in the abstracted skill inference process, skill uncertainty at an abstracted level may be inferred using a Monte-Carlo (MC) dropout technique.

The abstract skill policy network may internally infer task uncertainty and cognitive uncertainty in the skill inference process. When the task uncertainty is high, the robot agent determines that it cannot perform the task using the current manipulation skill learned (possessed) thereby, so replans a subtask (5). In this process, the subtask may be replanned based on information about the currently observed environment, after which the replanned subtask may be again transferred to the abstract skill policy network (6-1). Simultaneously, the subtask determined to be uncertain and the environment information at that time are stored such that the stored information is collected when additional demonstration data for the corresponding skill is required, whereby manipulation skills may be improved (6-2). The process of regenerating the subtask plan may be performed as shown in the following example.

subtask: "pick up a bottle of water", environmental condition: "the bottle lies flat", uncertainty: "high"
 replanned subtask: "straighten the bottle of water"

In the above example, when the current skill of the agent is inadequate for "straighten the bottle of water" corresponding to the replanned subtask, learning for improving the skill may be performed after additional demonstrations therefor are collected.

When the task uncertainty is low, a process of determining cognitive uncertainty may be performed (7). When the cognitive uncertainty is low, the given task is performed without change (8). However, when the cognitive uncertainty is not low, the task is performed first (9-1), experience data acquired in the process of performing the task is collected and stored in experience data storage, and the task-skill-planning capability of the abstract skill policy network may be updated later (9-2).

Hereinafter, the structure of the abstract skill policy network and an uncertainty inference process will be described in detail.

Figure 3:
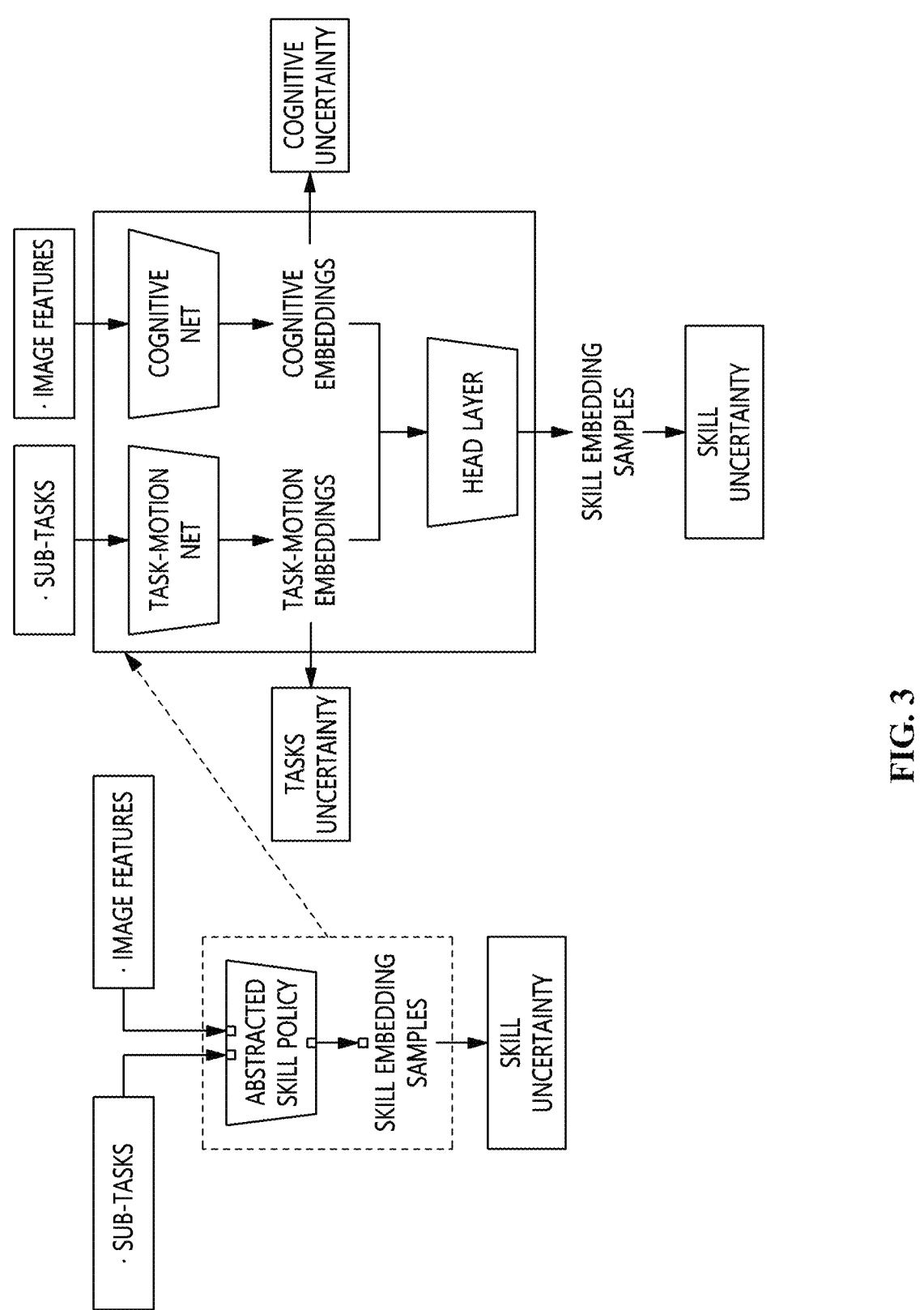
FIG. 3 illustrates a detailed structure of an abstract skill policy network.

FIG. 3 illustrates a detailed structure of an abstract skill policy network.

Referring to FIG. 3, the abstract skill policy network may be configured with a task-motion network and a cognitive network.

The task-motion network may learn the distribution of a task-motion embedding space for subtasks and motions corresponding thereto in a learning process, and the cognitive network may learn a cognitive embedding space for cognition of objects and the like based on feature vectors of an input image.

Based on the task-motion embedding and the cognitive embedding, a final skill embedding space may be learned by passing through the head layer of the abstract skill policy network. The respective embedding spaces including the skill embedding follow a multivariate Gaussian distribution, and the uncertainty in each embedding space may be inferred using MC-dropout and used for learning and performing tasks.

A total of three kinds of uncertainty may be inferred in the abstract skill policy, and the three kinds of uncertainty may include task uncertainty indicating the degree of certainty of the motion that a robot agent infers for an input subtask in relation to the skills learned from existing demonstration data, cognitive uncertainty indicating the degree of familiarity to the pattern of a task target object in an input image, and skill uncertainty that encompasses the task uncertainty and the cognitive uncertainty.

Figure 4:
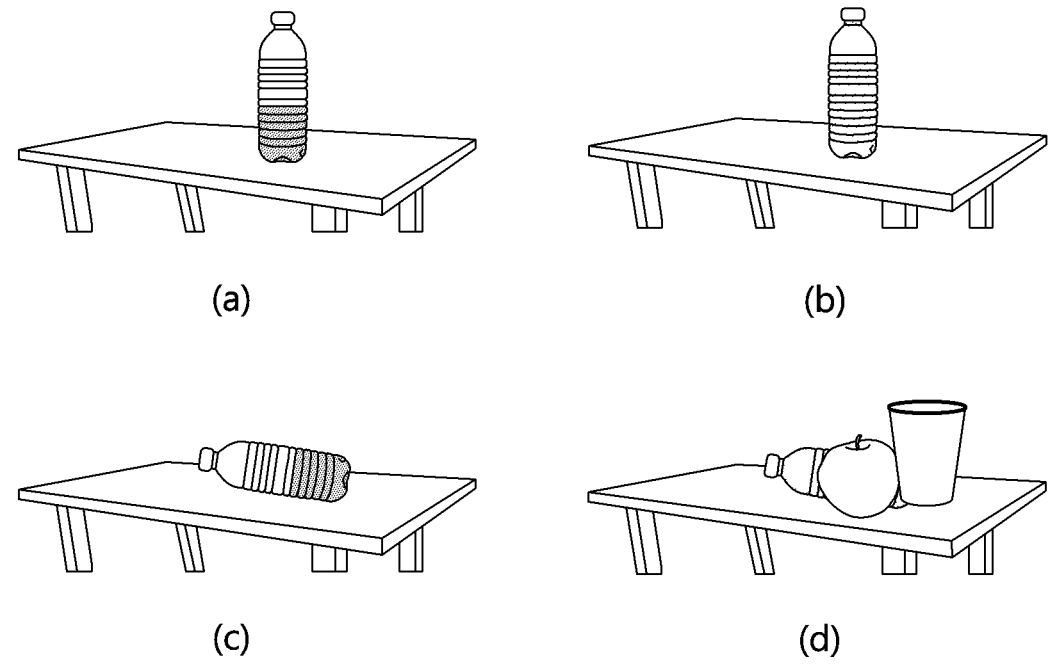
FIG. 4 is an example of uncertain situations for explaining an embodiment of the present disclosure.

FIG. 4 is an example of an uncertain situation for explaining an embodiment of the present disclosure.

Referring to FIG. 4, a total of four uncertain situations may be defined as follows in terms of task uncertainty and cognitive uncertainty depending on the situation of a task environment.

a) low task uncertainty, low cognitive uncertainty
b) low task uncertainty, high cognitive uncertainty
c) high task uncertainty, low cognitive uncertainty
d) high task uncertainty, high cognitive uncertainty FIG. 4 is illustrated in gray scale, but the case (a) and the case (c) in FIG. 4 assume that transparent liquid (water) is in a PET bottle, and the case (b) and the case (d) in FIG. 4 assume that yellow liquid is in a PET bottle.

In the case (a), the situation of the observed environment and the given task are similar to those learned in a learning process, so the task may be performed without change.

In the case (b), the object in the environment is different from the object observed in the learning process. In this case, the task is performed, experience data acquired in this process is stored, and adaptive learning for the abstract skill network is performed later.

In the case (c), the object itself in the environment is included in a training dataset, but the object is in a different state. That is, although only a standing water bottle is observed in the learning process, the water bottle in the current environment lies flat, so the task uncertainty of the planned subtask "picking a water bottle" is high. Accordingly, the subtasks are replanned to include {"upright the bottle", "picking the water bottle"}, and these subtasks may be sequentially performed.

In the case (d), both the task uncertainty and the cognitive uncertainty are high, and the same processes as the processes of the case (b) and the case (d) may be performed.

Table 1 below represents uncertainty in each situation and a follow-up learning procedure. Here, I.D indicates low uncertainty (In-Distribution), and OOD indicates high uncertainty (Out-of-Distribution).

Figure 5:
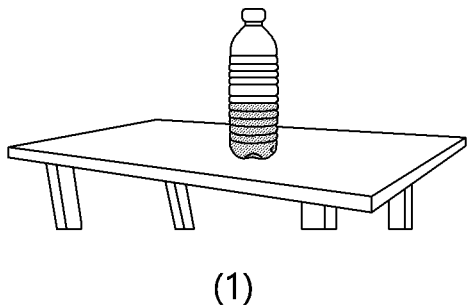
FIG. 5 and FIG. 6 conceptually illustrate a skill planning process in a skill embedding space depending on uncertainty.
Figure 5:
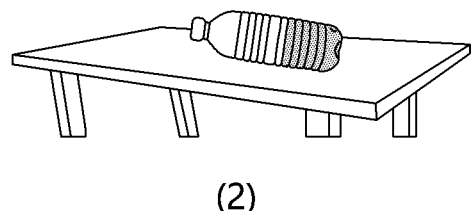
Figure 5:
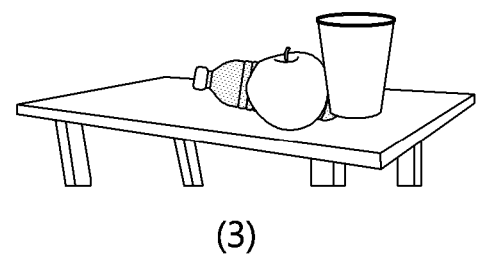
Figure 6:
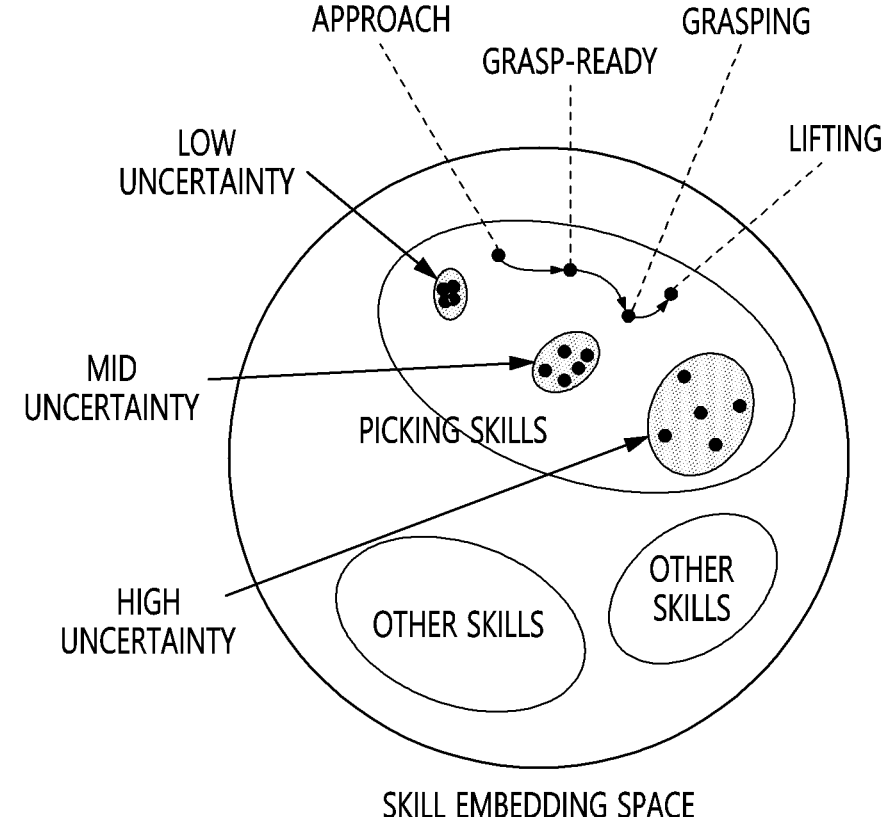

FIG. 5 and FIG. 6 conceptually illustrate a skill plan process in a skill embedding space depending on uncertainty.

The cases (1), (2), and (3) in FIG. 5 respectively illustrate the case in which uncertainty is low, the case in which uncertainty is medium, and the case in which uncertainty is high.

Referring to FIG. 6, as the situation of the observed environment is farther away from the distribution of a training dataset, an uncertainty region in a skill embedding space is further expanded. In the upper part of FIG. 6, the process of planning the task "picking a water bottle" to sequentially perform {"approach", "grasp-ready", "grasping", "lifting" } in the [picking skill] subregion of the skill embedding space using the abstract skill policy.

The uncertainty-based manipulation skill inference method proposed in the present disclosure includes a method for inferring more stable skills by conservatively performing skill planning depending on the degree of uncertainty that is inferred by an abstract skill policy network when the skill is planned. Hereinbelow, a method for actually inferring the uncertainty of a skill using MC-dropout in a skill embedding space will be described.

In the skill embedding space, a skill $z_t$ at the current time follows multivariate Gaussian distribution as shown below:

$$z_t \sim \mathcal{N}(\mu, \Sigma)$$

The uncertainty of a skill is inferred using an MC-dropout technique, and the determinants of covariance matrices of a multivariate distribution, which are collected through N skill inferences, are calculated, and the standard deviation thereof is calculated as shown in Equation (1) below, whereby the uncertainty at time t may be inferred.

$$\xi_t = std\left(\left\{|\sum\nolimits_1|, |\sum\nolimits_2|, \ldots, |\sum\nolimits_N|\right\}\right) \tag{1}$$

Because the inferred skill uncertainty may have a very large range depending on the circumstances, it is normalized to a value ranging from 0 to 1 through the process of Equation (2):

$$\xi_t = 1.0 - \exp(-\epsilon \xi) \tag{2}$$

The constant epsilon ($\epsilon$) multiplied by the element of the exponential function is a parameter that is arbitrarily tuned by a user. Using the normalized skill uncertainty, a conser-

TABLE 1

| Situation | Task uncertainty | Cognitive uncertainty | Follow-up learning procedure |
|---|---|---|---|
| I.D object I.D subtask | low | low | Infer skill |
| OOD object I.D subtask | low | high | Perform task, Store experience data and perform learning for improving manipulation skill plan (target: abstract skill policy) |
| I.D object OOD subtask | high | low | Replan task, Collect additional demonstration for OOD skill (when there is no data) and learn the same (target: manipulation skill policy) |
| OOD object OOD subtask | high | high | Replan task, Perform additional learning for OOD skill (manipulation skill policy), Improve manipulation skill plan (abstract skill policy) | vative skill path may be searched for in consideration of the degree of uncertainty when a skill embedding is inferred, as shown in Equation (3) below.

$$\hat{z}_t = \left(1 - \hat{\xi}_t\right)z_t + \left(\hat{\xi}_t\right)z_{t-1} \qquad (3)$$

The skill embedding $\hat{z}_t$ is aimed at improving stability of manipulation skill performance in an uncertain situation by performing inference to be more dependent on a previous skill when the uncertainty is high.

Figure 7:
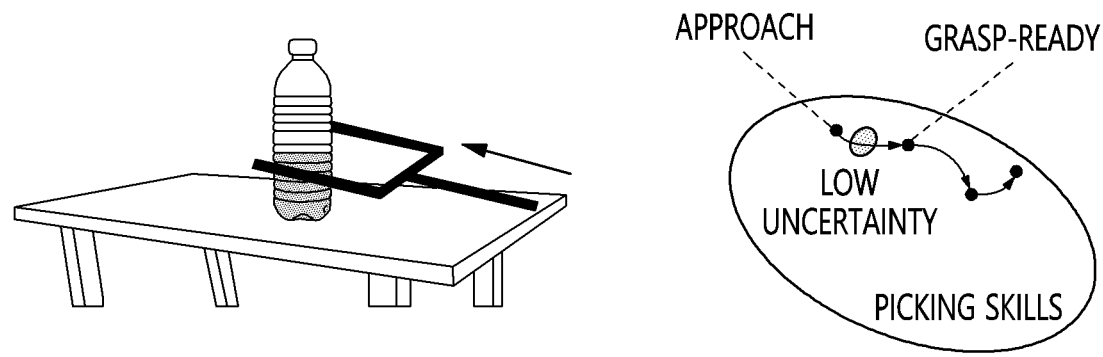
FIG. 7 and FIG. 8 are examples for explaining a conservative skill inference method.
Figure 8:
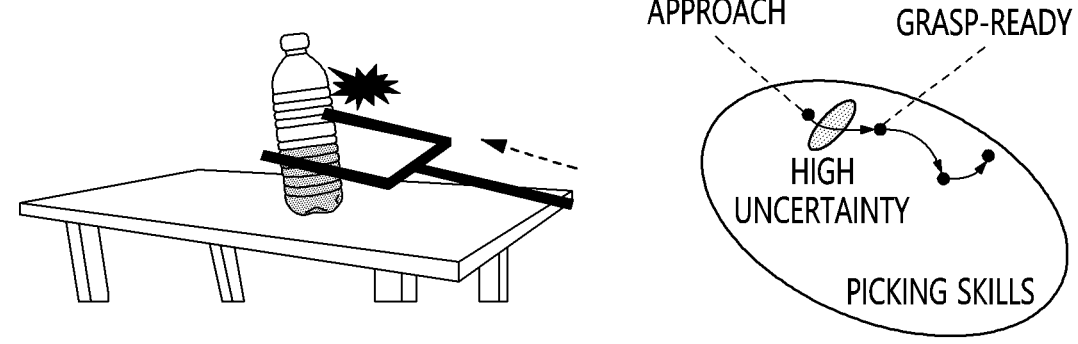

FIG. 7 and FIG. 8 are examples for explaining a conservative skill inference method.

FIG. 7 is the case in which a skill is performed in a normal range as trained before. Because low uncertainty is inferred in the process of proceeding to 'grasp-ready' after approaching a water bottle, the skill is performed by giving more weight to the current skill embedding $z_t$.

However, the situation in FIG. 8 corresponds to the moment at which a water bottle is tilted because the tip of a robot gripper hits the water bottle in the process of proceeding to 'grasp-ready' after approaching the water bottle. Here, the approach of the gripper and the situation in which the water bottle is tilted are different from the data observed in the training data, and the skill embedding distribution grows away from that.

Accordingly, relatively high uncertainty is inferred, and thus a skill is performed to be more dependent on the previous skill embedding $z_{t-1}$ according to Equation (3). Through such conservative skill inference based on uncertainty, more stable skill inference is possible, and particularly in the process of performing a robot skill in the real-world environment, high safety may be secured, compared to an existing method, when a robot, an object, and a human interact with each other.

Figure 9:
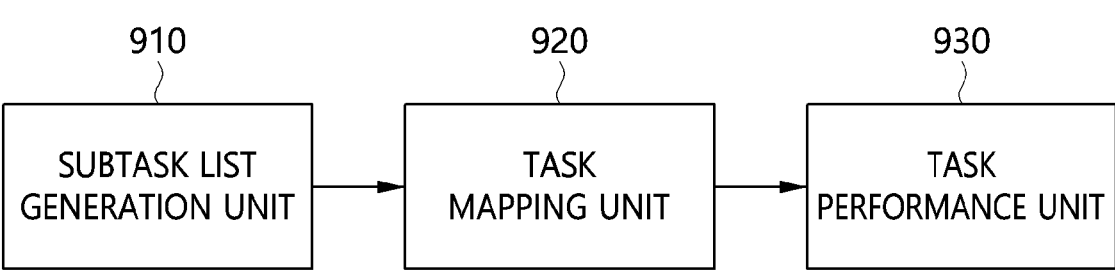
FIG. 9 is a block diagram illustrating an apparatus for performing a robot skill based on skill uncertainty using a large language model according to an embodiment of the present disclosure.

FIG. 9 is a block diagram illustrating an apparatus for performing a robot skill based on skill uncertainty using a large language model according to an embodiment of the present disclosure.

The apparatus for performing a robot skill based on skill uncertainty using a large language model according to an embodiment of the present disclosure includes a subtask list generation unit 910 for generating a subtask list using a large language model by receiving a target task and environment information, a task mapping unit 920 for mapping a subtask in the subtask list into a skill embedding space through an abstract skill policy network, and a task performance unit 930 for performing the subtask by decoding the mapped subtask through a manipulation skill policy network.

Here, the task mapping unit 920 may infer task uncertainty and cognitive uncertainty through the abstract skill policy network.

Here, the subtask list generation unit 910 may regenerate the subtask list when the task uncertainty is greater than a preset value.

Here, the task performance unit 930 may store experience data of the process of performing the subtask when the cognitive uncertainty is greater than a preset value.

Here, the abstract skill policy network includes a task-motion network and a cognitive network, and the task-motion network may generate output of a task-motion embedding space by receiving a subtask, and the cognitive network may generate output of a cognitive embedding space by receiving an image feature vector.

Here, the task mapping unit 920 may calculate the task uncertainty based on the output of the task-motion embedding space, calculate the cognitive uncertainty based on the output of the cognitive embedding space, and calculate skill uncertainty through a neural network layer by receiving the output of the task-motion embedding space and the output of the cognitive embedding space.

Here, the task mapping unit 920 may calculate the skill uncertainty based on the result of mapping the subtask into the embedding space.

Here, the task performance unit 930 may calculate the skill uncertainty at preset time intervals and set a weight for the output of the skill embedding space at a specific time based on the skill uncertainty.

Here, the weight for the output of the skill embedding space may decrease with an increase in the skill uncertainty.

Figure 10:
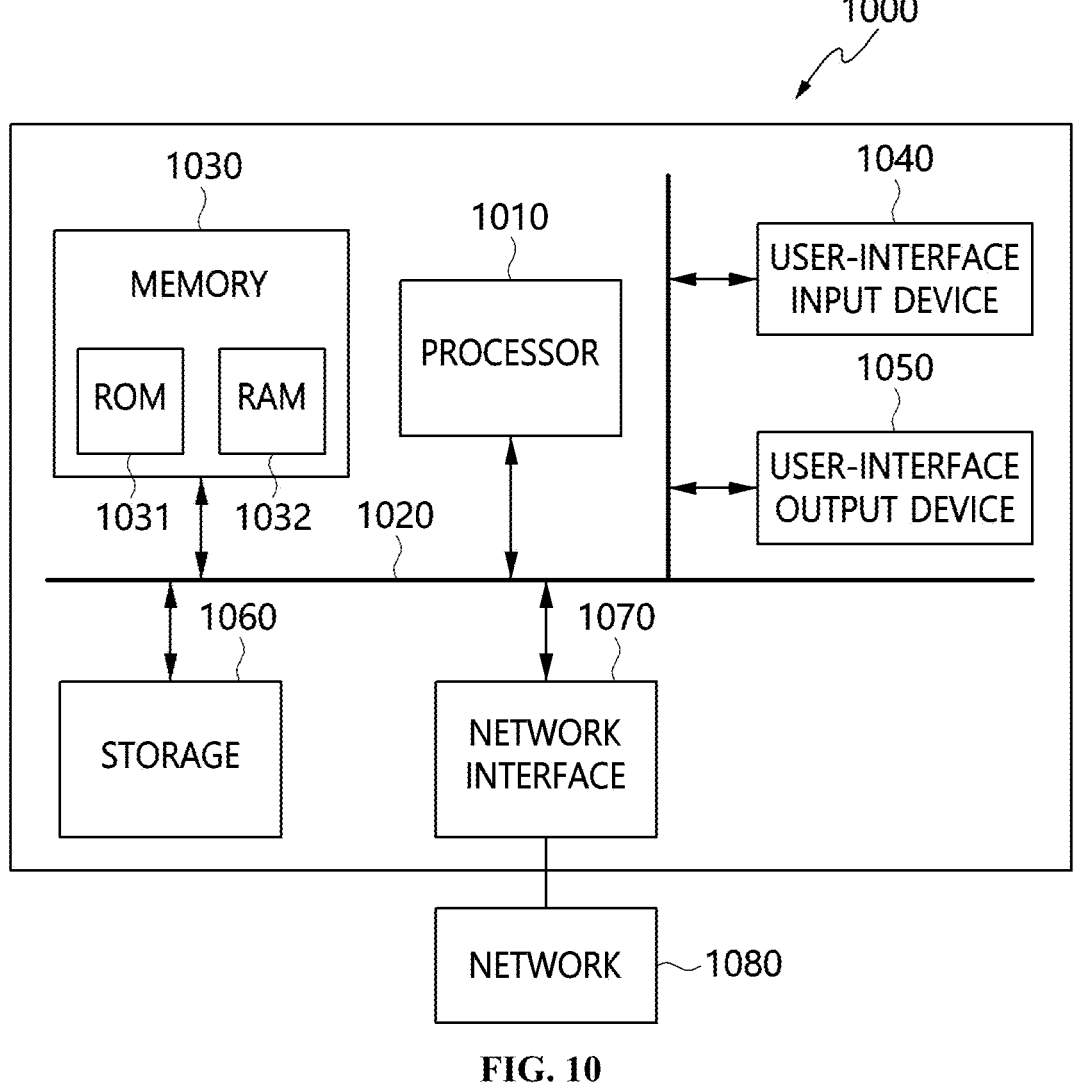
FIG. 10 is a view illustrating the configuration of a computer system according to an embodiment.

FIG. 10 is a view illustrating the configuration of a computer system according to an embodiment.

The apparatus for performing a robot skill based on skill uncertainty using a large language model according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to the present disclosure, a high degree of involvement and supervision of humans required in a robot manipulation skill learning process may be minimized.

Also, the present disclosure may enable a robot to infer uncertainty of a task by itself and reflect the uncertainty to performance of a manipulation skill.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for performing a robot skill based on skill uncertainty using a large language model, comprising:

generating a subtask list using a large language model by receiving a target task and environment information;

mapping a subtask in the subtask list into a skill embedding space through an abstract skill policy network; and performing the subtask by decoding the mapped subtask through a manipulation skill policy network, wherein mapping the subtask comprises inferring, by the abstract skill policy network, cognitive uncertainty indicating a degree of familiarity to a pattern of a task target object in an input image, wherein performing the subtask comprises storing experience data of a process of performing the subtask when the cognitive uncertainty is greater than a preset value, the experience data being actually acquired in the process, wherein the abstract skill policy network is improved using the experience data as a new training dataset for improving an abstract skill policy output by the abstract skill policy network.

2. The method of claim 1, wherein mapping the subtask comprises inferring task uncertainty through the abstract skill policy network.

3. The method of claim 2, wherein mapping the subtask comprises regenerating the subtask list when the task uncertainty is greater than a preset value.

4. The method of claim 2, wherein:

the abstract skill policy network includes a task-motion network and a cognitive network, the task-motion network generates output of a task-motion embedding space by receiving the subtask, and the cognitive network generates output of a cognitive embedding space by receiving an image feature vector.

5. The method of claim 4, wherein mapping the subtask comprises calculating the task uncertainty based on the output of the task-motion embedding space, calculating the cognitive uncertainty based on the output of the cognitive embedding space, and calculating skill uncertainty through a neural network layer by receiving the output of the task-motion embedding space and the output of the cognitive embedding space.

6. The method of claim 1, wherein mapping the subtask comprises calculating skill uncertainty based on a result of mapping the subtask into the embedding space.

7. The method of claim 6, wherein performing the subtask comprises calculating the skill uncertainty at preset time intervals and setting a weight for output of the skill embedding space at a specific time based on the skill uncertainty.

8. The method of claim 7, wherein the weight for the output of the skill embedding space decreases with an increase in the skill uncertainty.

9. An apparatus for performing a robot skill based on skill uncertainty using a large language model, comprising:

a subtask list generation unit for generating a subtask list using a large language model by receiving a target task and environment information;

a task mapping unit for mapping a subtask in the subtask list into a skill embedding space through an abstract skill policy network; and a task performance unit for performing the subtask by decoding the mapped subtask through a manipulation skill policy network, wherein the task mapping unit infers, by the abstract skill policy network, cognitive uncertainty indicating a degree of familiarity to a pattern of a task target object in an input image, wherein the task performance unit stores experience data of a process of performing the subtask when the cognitive uncertainty is greater than a preset value, the experience data being actually acquired in the process, wherein the abstract skill policy network is improved using the experience data as a new training dataset for improving an abstract skill policy output by the abstract skill policy network.

10. The apparatus of claim 9, wherein the task mapping unit infers task uncertainty through the abstract skill policy network.

11. The apparatus of claim 10, wherein the subtask list generation unit regenerates the subtask list when the task uncertainty is greater than a preset value.

12. The apparatus of claim 10, wherein:

the abstract skill policy network includes a task-motion network and a cognitive network, the task-motion network generates output of a task-motion embedding space by receiving the subtask, and the cognitive network generates output of a cognitive embedding space by receiving an image feature vector.

13. The apparatus of claim 12, wherein the task mapping unit calculates the task uncertainty based on the output of the task-motion embedding space, calculates the cognitive uncertainty based on the output of the cognitive embedding space, and calculates skill uncertainty through a neural network layer by receiving the output of the task-motion embedding space and the output of the cognitive embedding space.

14. The apparatus of claim 9, wherein the task mapping unit calculates skill uncertainty based on a result of mapping the subtask into the embedding space.

15. The apparatus of claim 14, wherein the task performance unit calculates the skill uncertainty at preset time intervals and sets a weight for output of the skill embedding space at a specific time based on the skill uncertainty.

16. The apparatus of claim 15, wherein the weight for the output of the skill embedding space decreases with an increase in the skill uncertainty.

* * * * *